United States Patent [19]

Itoh et al.

[11] Patent Number: 5,037,186
[45] Date of Patent: Aug. 6, 1991

[54] OPTICAL FILTER EMPLOYING A COPOLYGLUTAMATE HAVING THERMOTROPIC CHOLESTERIC LIQUID CRYSTAL PROPERTIES

[75] Inventors: Hiroyuki Itoh; Shingo Orii, both of Kawasaki; Tetsuo Satoh, Yokohama, all of Japan

[73] Assignee: Nippon Oil Company, Limited, Tokyo, Japan

[21] Appl. No.: 306,239

[22] Filed: Feb. 2, 1989

[30] Foreign Application Priority Data

Dec. 11, 1985 [JP] Japan ............... 60-277018

[51] Int. Cl.$^5$ .............................. G02F 1/13
[52] U.S. Cl. ............... 359/105 R; 252/299.7; 252/299.01
[58] Field of Search .......... 350/350 R, 351, 347 V; 252/299.01, 299.6, 299.7; 428/1

[56] References Cited

U.S. PATENT DOCUMENTS

| | | | |
|---|---|---|---|
| 4,637,896 | 1/1987 | Shannon | 252/299.7 |
| 4,679,911 | 7/1987 | Jacobs et al. | 350/347 |
| 4,725,460 | 2/1988 | Matsuo et al. | 428/1 |
| 4,743,675 | 5/1988 | Watanabe | 428/1 |
| 4,837,745 | 6/1989 | Eich et al. | 365/108 |
| 4,886,718 | 12/1989 | Eich et al. | 252/299.6 X |

FOREIGN PATENT DOCUMENTS

| | | | |
|---|---|---|---|
| 154953 | 9/1985 | European Pat. Off. | 428/1 |
| 208419 | 1/1987 | European Pat. Off. | 252/299.01 |
| 139506 | 10/1981 | Japan . | |

OTHER PUBLICATIONS

Watanabe et al., Macromolecules, vol. 17, pp. 1004–1009 (1984).
Kurotu et al., CA 92:164276v (1980).
Kasuga et al., CA 97:47759x (1982).
Shibaev, V. P. et al. in Liquid Crystal Polymers II/III, M. Gordon Ed., Springer-Verlag, Berlin, 1984, pp. 220–225.
J. Adams et al., J. Appl. Phys. 42 (10), 4096–4098 (1971).
T. Tsutsui et al., Polymer, 22, 117–123 (1981).

*Primary Examiner*—John S. Maples
*Assistant Examiner*—Richard Treanor
*Attorney, Agent, or Firm*—Scully, Scott, Murphy & Presser

[57] ABSTRACT

An optical filter consisting essentially of a glutamate copolymer having thermotropic cholesteric liquid crystal properties and represented by the general formula:

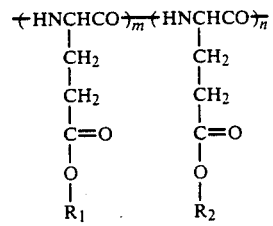

wherein $R_1$ is an alkyl group, a cycloalkyl group, an aryl group or an arylalkyl group having 10 or less carbon atoms, and $R_2$ an alkyl group, a cycloalkyl group, an aryl group or an arylalkyl group having 6 to 30 carbon atoms, provided that $R_1$ and $R_2$ are different from each other; m and n are numbers satisfying the following relationships $50 \leq m+n \leq 2000$ and $m/n = 80$ to 10/20 to 90.

5 Claims, No Drawings

OPTICAL FILTER EMPLOYING A COPOLYGLUTAMATE HAVING THERMOTROPIC CHOLESTERIC LIQUID CRYSTAL PROPERTIES

This application is a continuation of application Ser. No. 938,264, filed Dec. 5, 1986, now abandoned.

BACKGROUND OF THE INVENTION

This invention relates to an optical member, particularly an optical filter. More particularly, the present invention is concerned with an optical filter consisting essentially of a copolymer which exhibits thermotropic cholesteric liquid crystal properties and comprising specific two kinds of L-glutamates and/or D-glutamates, and suitable for use as an optical filter for a color display and a branching filter for synthesizing or separating multiple optical signals, and a notch filter, a band-pass filter, a circularly polarizing filter and an optical isolator which are used for various applications.

An optical member, particularly an optical filter is an important structural element in the field of optoelectronics such as displays and optical communications, and filters made of various materials and having various functions are used therefor. For example, in the field of a color display, a filter comprising a number of arranged picture elements comprising color filters respectively for R (red), G (green) and B (blue) is used. In this case, since the spectroscopic wavelength ranges respectively for R, G and B filters partially overlap with each other, a notch filter is used for cutting off the wavelength in the overlapped ranges. Although a notch filter made of an acryl resin containing neodymium has conventionally been used, it has disadvantages such as disagreement of the absorption wavelength range with the wavelength range to be cut off, small degree of absorption and difficulty in forming it into a thin sheet. Therefore, the development of a high performance notch filter capable of freely controlling the wavelength ranges to be cut off and being produced and processed with ease has been demanded.

Meanwhile, in the field of optical communications, wavelength multiplex transmission techniques have been developed to increase the transmission capacity per optical fiber and is expected to be applied to a subscriber transmission system. In the wavelength multiplex transmission system, a branching filter for synthesizing or separating multiple optical signals should be necessarily used, and an interference film optical branching filter and a diffraction grating optical branching filter have conventionally been developed therefor. The former is advantageous in that the central wavelength and bandwidth can be freely designed but disadvantageously requires extremely sophisticated techniques in forming an interference film and much work, causing not only difficulty in producing it but also increase in cost with the increase in the wave number to be separated. On the other hand, although the latter has an advantage that a number of waves can be separated using one diffraction grating, it is disadvantageous not only in that the wavelength band in which a high diffraction grating efficiency can be achieved is limited to that near the blaze wavelength, causing difficulty in widening the band, but also in that it requires sophisticated producing techniques and is high in cost. Therefore, also in the field of optical fiber communications, the production of a high precision band-pass filter or notch filter is extremely useful because such band-pass filter or notch filter can be used as a branching filter which is easy to produce, light in weight and low in cost.

Besides the above-mentioned fields, various optical filters such as an optical isolator, a half mirror and a circularly polarizing filter are used in the fields of optoelectronics and optics as well. These optical filters have serious disadvantages such as difficulties in producing them and maintenance and high cost and, sometimes, insufficient performance, because they are produced by combining a lens, a prism, a diffraction grating, etc. which have been generally produced by precision working of glass, metals or inorganic materials with a sophisticated technique.

Meanwhile, attempts have been made to apply specific optical effects of a cholesteric liquid crystal to an optical member. When the pitch of the helical structure is p and the average refractive index n, if the incident light is perpendicular to the sheet surface, the cholesteric liquid crystal has a wavelength, $\lambda$, corresponding to $\lambda = p \cdot n$, and selectively reflects a right-handed circularly polarized light or a left-handed circularly polarized light according to the direction of the helical axis. Therefore, the cholesteric liquid crystal can be used as a notch filter, a band-pass filter, a circularly polarizing filter, etc. by skillfully taking advantage of the above-mentioned properties. For example, Japanese Patent Laid-Open No. 139506/1981 discloses a visible light reflecting polymer composite comprising a cholesteric liquid crystal having a helical pitch capable of selectively reflecting light belonging to a visible region and immobilized by an amorphous polymer. The visible light reflecting polymer composite is prepared by a method which comprises forming a cholesteric liquid crystal from a polyglutamate (L- or D-isomer), which is known as having lyotropic cholesteric liquid crystal properties, using a photopolymerizable unsaturated monomer as a solvent and exposing the mixture to light rays to polymerize the unsaturated monomer and to immobilize the cholesteric structure by the resulting polymer. In the above-mentioned method, since the liquid crystal used is limited to a polymer which exhibits lyotropic cholesteric liquid crystal properties, and it has a structure immobilized by polymerizing an unsaturated monomer which has been used as a solvent, not only difficulties are encountered in finding out conditions of preparation under which the pitch of the cholesteric liquid crystal can freely be varied but also it is impossible to vary the pitch of the cholesteric liquid crystal, once it has been prepared, after immobilization thereof. Japanese Patent Laid-Open No. 191203/1985 discloses a method of preparing a notch filter which comprises forming lyotropic cholesteric liquid crystals from poly-L-glutamic acid $\gamma$-butyl ester and poly-D-glutamic acid $\gamma$-butyl ester each using triethylene glycol dimethacrylate as a solvent with the same technique as mentioned above, immobilizing the liquid crystals by photopolymerization and laminating the resulting two films. However, this method has the same disadvantages as that mentioned above with regard to Japanese Patent Laid-Open No. 139506/1981 because the two methods use the same techniques.

The present inventors have previously found that a copolymer of a specific two kinds of glutamates exhibits thermotropic cholesteric liquid crystal properties. This copolymer has various advantages as follows. Since the copolymer is thermotropic, there is no need for using any solvent in developing a cholesteric structure as opposed to the above-mentioned cases where the polymer is lyotropic. Further, the cholesteric structure can be immobilized simply by rapidly cooling a heated copolymer, which leads to an extremely easy production of an immobilized liquid crystal. Moreover, the pitch, i.e. selective reflection wavelength, can freely be varied with great advantages by heating the immobilized cholesteric structure which has once been prepared at a temperature different from that used in preparing it. Since these properties are suitable for preparation of various optical filters which require a precise control of transmitting wavelength and cutting wavelength, it is expected that the application to these optical filters will produce various favorable effects with great advantages.

SUMMARY OF THE INVENTION

Accordingly, it is an object of the present invention to provide an optical filter consisting of a glutamate copolymer having thermotropic cholesteric liquid crystal properties and capable of not only freely and precisely controlling transmitting or cutting wavelength with the well-defined wavelength range but also being rapidly prepared.

It is another object of the present invention to provide a process for producing an optical filter which enables a cholesteric liquid crystal structure to be immobilized intact and, at the same time, an improvement in criticalness in selecting the wavelength to be attained.

The optical filter of the present invention consists essentially of a glutamate copolymer having thermotropic cholesteric liquid crystal properties and represented by the following general formula:

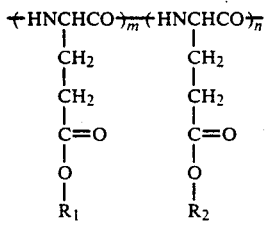

wherein $R_1$ is an alkyl group, a cycloalkyl group, an aryl group or an arylalkyl group having 10 or less carbon atoms, and $R_2$ an alkyl group, a cycloalkyl group, an aryl group or an arylalkyl group having 6 to 30 carbon atoms, provided that $R_1$ and $R_2$ are different from each other; m and n are numbers satisfying the following relationships $50 \leq m+n = 2000$ and $m/n = 80$ to $10/20$ to $90$.

DETAILED DESCRIPTION OF THE INVENTION

In order that the above glutamate copolymer may exhibit thermotropic cholesteric properties, it is necessary that the difference in the number of carbon atoms between $R_1$ and $R_2$ be 5 or more. When the difference in the number of carbon atoms is 4 or less, such copolymer does not exhibit thermotropic cholesteric liquid crystal properties. It is preferred that the alkyl group for $R_1$ be methyl, ethyl, propyl, isopropyl, butyl, pentyl, hexyl, octyl and decyl groups and groups having the same number of carbon atoms as these groups but having a branched structure. Among them methyl, ethyl, propyl, butyl and branched butyl groups are particularly preferably used. Preferred cycloalkyl groups for $R_1$ include those having 5 or more carbon atoms, such as cyclopentyl, cyclopentylmethyl, methylcyclopentyl, ethylcyclopentyl, butylcyclopentyl, cyclohexyl, cyclohexylethyl, cyclohexylpropyl and cyclohexylbutyl groups. Among them cyclopentyl, cyclohexyl, cyclopentylmethyl and cyclohexylmethyl groups are particularly preferable. Preferred aryl groups for $R_1$ include a phenyl group and substituted phenyl groups such as methoxyphenyl, tolyl and dimethyltolyl groups. Preferred arylalkyl groups for $R_1$ include those having 6 or more carbon atoms, such as benzyl, methylbenzyl, phenylethyl, methylphenylethyl, phenylpropyl and phenylbutyl groups. Among them benzyl and methylbenzyl groups are particularly preferable. It is preferred that the alkyl group for $R_2$ be hexyl, heptyl, octyl, decyl, dodecyl, octadecyl, hexadecyl and eicosyl groups and groups having the same number of carbon atoms as these groups but having a branched structure. Among them hexyl, decyl, dodecyl and octadecyl groups are particularly preferred. Preferred cycloalkyl groups for $R_2$ include cyclohexyl, methylcyclohexyl, ethylcyclohexyl, butylcyclohexyl, hexylcyclohexyl, cyclooctyl, methylcyclooctyl and cylododecyl groups. Preferred aryl groups for $R_2$ include a phenyl group and substituted phenyl groups such as tolyl, butylphenyl, decylphenyl and dodecylphenyl groups. Preferred arylalkyl groups for $R_2$ include benzyl, phenylethyl, phenylpropyl, phenylbutyl, phenylhexyl, phenyloctyl, phenyldodecyl, methylphenylbutyl, ethylphenylhexyl and methylphenyldodecyl groups. Among them phenylhexyl, phenyldodecyl and phenyloctyl groups are particularly preferred. As mentioned above, it is required that $R_1$ and $R_2$ be chosen in such a manner that $R_2$ has at least 5 more carbon atoms than $R_1$. In the above-mentioned general formula, the ratio of m to n is 80 to 10/20 to 90, preferably 70 to 40/30 to 60, and, in general, respective repeating units are randomly arranged. When the ratio of m to n is not in the above-mentioned range, the copolymer does not exhibit clear thermotropic cholesteric properties. Further, the sum of m and n, i.e., the degree of polymerization is 50 to 2000, preferably 100 to 1500. When the degree of polymerization is less than 50, difficulties are encountered in vitrifying the liquid crystal structure. On the other hand, when the degree of polymerization is too large, the copolymer is unfavorable from the practical point of view since not only the moldability of it is poor but also the growth rate of the cholesteric structure is lowered.

The glutamate copolymer of the present invention which exhibits thermotropic cholesteric properties has the following characteristics suitable for use in an optical filter.

(1) Since the cholesteric pitch can freely be varied in a wide range by varying the temperature, kind of copolymer and copolymer compositions, the selective reflection wavelength can freely be varied from an ultraviolet region to an infrared region.

(2) The spectral width of light of the selective reflection wavelength which depends on the pitch is extremely narrow.

(3) Since the cholesteric liquid crystal can completely be immobilized by means such as rapid cooling, there is no need for conducting complicated procedures such as polymerization of a monomer used as a solvent which is necessary for immobilizing a lyotropic liquid crystal.

(4) The immobilized liquid crystal is extremely stable at a temperature lower than that necessary for transition to the cholesteric liquid crystal.

(5) After immobilization, the shift to another pitch, i.e., another selective reflection wavelength can easily be made by heating at a temperature above the transition temperature.

The copolymer to be used in the present invention can be prepared by various methods, e.g., the NCA method which is known in the technical field to which the present invention belong. Specifically, the copolymer to be used in the present invention can be prepared by copolymerization between predetermined two kinds of anhydrous N-carboxyglutamic acid γ-esters (NCA). Alternatively, the copolymer can be preferably prepared by synthesizing a polymer such as poly(γ-methyl L-glutamate) or poly(γ-benzyl L-glutamate) and subjecting a part of the ester groups in the polymer to an ester exchange using a predetermined alcohol.

The process for producing an optical filter of the present invention will now be described below. When the cholesteric pitch of the copolymer is taken as p, the average refractive index n, the angle of incidence of light on the helical face of the cholesteric liquid crystal θ and the selective reflection wavelength λ, the following relationship holds:

$$\lambda = n\, p.\sin\theta$$

In this case, among incident light, a right-handed circularly polarized light (when the helical axis is clockwise, i.e., the polymer is an L-isomer) of the wavelength λ or a left-handed circularly polarized light (when the helical axis is counterclockwise, i.e., the polymer is a D-isomer) is reflected. Therefore, theoretically, a circularly polarizing filter capable of reflecting 50% of the incident light of the wavelength λ can be obtained by using a film made of either a right-handed polymer or a left-handed polymer.

Further, a notch filter capable of reflecting (i.e., cutting off) almost all of the light of the wavelength λ(=λA=λB) can be obtained by choosing two kinds of copolymers of which the pitches are respectively pA and pB, the average refractive index are respectively nA and nB and the selective reflection wavelength are respectively λA and λB and which are reverse in optical rotation in such a manner that the following relationship is established (wherein the angle of incidence is assumed as 90°):

$$\lambda A = \lambda B = nA\, pA = nM\, pB$$

and laminating two films respectively made of the chosen copolymers.

The performance of an optical filter is determined by the degree of reflection and spectral width. The important factors which determine the degree of reflection and spectral width reside in the degree of control of the cholesteric structure (i.e., how completely the cholesteric structure is formed) and how completely the formed cholesteric structure is immobilized. The higher the degree of formation of the cholesteric structure and the higher the degree of the immobilization of the cholesteric structure, the more closely approaches 100% the degree of reflection (degree of cutting off) of a specific wavelength and the sharper the spectral width. As mentioned above, it is another object of the present invention is to provide a process for producing an optical filter capable of providing a sufficient degree of reflection and a sharp spectrum. According to the process of the present invention, a D-glutamate copolymer is first heated at a temperature above the melting point for a predetermined period of time and then preoriented by applying a shearing force by such means as compression, rolling or stretching. Subsequently, the copolymer is heated while the shear force is applied or after the shear force is removed for a predetermined period of time at such a temperature as will provide the formation of a cholesteric pitch which exhibits the intended selective reflection wavelength, thereby sufficiently growing the cholesteric liquid crystal. A film capable of reflecting 100% of the left-handed circularly polarized light of the wavelength, i.e., 50% of the whole amount of light of the wavelength is prepared by rapidly cooling the cholesteric liquid crystal with water or air to immobilize the cholesteric liquid crystal. Then a film capable of reflecting 100% of the right-handed polarized light of the same wavelength as mentioned above, i.e., 50% of the whole amount of light of the wavelength is prepared from an L-glutamate copolymer in the same manner as mentioned above. The two films thus prepared in such a manner that the above-mentioned relationship, i.e., nA pA=nB pB, is satisfied are laminated so that the optical axes are parallel to each other, whereby a filter capable of sharply cutting off 100% of the light of a specific wavelength can be obtained. The most important characteristic feature of the process of the present invention resides in that preorientation of a copolymer is conducted by applying a shearing force at a temperature above the melting point of the copolymer and the preoriented copolymer is sufficiently heated to grow the cholesteric liquid crystal structure before the liquid crystal structure is immobilized by rapid cooling. A filter capable of sharply cutting off the light of a specific wavelength with a degree of reflection of substantially 100% can be prepared through the above steps.

The method for applying a shearing force in preorientation includes press molding, rolling with reduction rolls and stretching under tension. Although the time required for preorientation is generally 1 min to 1 hr, 5 to 15 min is sufficient for the preorientation and is preferable from the standpoint of simpleness of the step. The time required for growing the cholesteric liquid crystal by heating after the preorientation is preferably 10 min to 5 hr, particularly preferably 30 min to 3 hr. When the time is shorter than 10 min, the formation of the cholesteric structure is insufficient, leading to poor performance of the resulting filter. On the other hand, when the time is longer than 5 hr, not only it takes time to prepare an optical filter but also the cholesteric structure which has once been formed may unfavorably be disordered.

In preparing a filter from a glutamate copolymer by the above-mentioned method, it is also preferable that the polymer film be sandwiched between other two transparent films. In this case, the filter is a composite film of three layers comprising upper and lower layers of a transparent film and an intermediate layer serving as a filter. The upper and lower layers serve to not only increase the strength and environmental resistance such as moisture resistance but also protect the filter layer against dust etc. In preparing the composite film, either the preorientation may be conducted after a copolymer is sandwiched between the two transparent films or a glutamate copolymer which has previously been preoriented may be sandwiched between two transparent films and the subsequent film may be applied to the resulting composite film. The film used for this purpose may be any one having a high transparency, e.g., polystyrene, polymethyl methacrylate, polycarbonate, polyethylene terephthalate, polypropylene, poly(4-methyl-1-pentene) and inorganic glass.

A pair of films comprising a polymer film of the D-isomer and a polymer film of the L-isomer laminated thereon and capable of selectively cutting off the light of a specific wavelength and a composite film comprising a pair of films as mentioned above which have been sandwiched between other two transparent films serve as a notch filter. Further, a multinotch filter can be obtained by laminating a plurality of pairs of films each capable of reflecting light of a different wavelength in such a manner that the optical axes are parallel to each other. Moreover, a band-pass filter can be obtained by laminating a number of pairs of films in such a manner that a specific wavelength range can pass and all the other wavelength range can be cut off. Various optical devices can be prepared by combining the above-mentioned circularly polarizing filter, notch filter or band-pass filter with other transparent film, transparent sheet, color filter, color polarized sheet, polarized sheet, ½ wavelength sheet or ¼ wavelength sheet.

DETAILED DESCRIPTION OF THE PREFERRED EMBODIMENTS

The optical filter of the present invention will be described in more detail with reference to the following Examples that should not be construed as limiting the scope of the invention.

REFERENCE EXAMPLE 1

20 g of poly($\gamma$-benzyl L-glutamate)(molecular weight: 15000; average degree of polymerization: 69) prepared by the NCA method was dissolved in 1,2-dichloroethane. To the resulting solution were added 150 ml of n-dodecyl alcohol and 5 g of p-toluenesulfonic acid. The reaction was allowed to proceed at 60° C. for 15 hours. The reaction mixture was poured into a large amount of methanol to precipitate the formed polymer. The polymer was filtered and dried. Subsequently, the polymer was dissolved in 1,2-dichloroethane again, reprecipitated with methanol, filtered and dried to obtain a purified $\gamma$-benzyl L-glutamate/$\gamma$-dodecyl L-glutamate copolymer. The ratio of the benzyl ester to the dodecyl ester in the copolymer was determined by NMR and was found to be 61:39.

REFERENCE EXAMPLE 2

A $\gamma$-benzyl D-glutamate/$\gamma$-dodecyl D-glutamate copolymer was prepared using poly($\gamma$-benzyl D-glutamate)(molecular weight: 16000; average degree of polymerization: 73) prepared by the NCA method in the same manner as in REFERENCE EXAMPLE 1. The ratio of the benzyl ester to the dodecyl ester in the copolymer was determined by NMR and was found to be 62:38.

EXAMPLE 1

1.2 g of the $\gamma$-benzyl L-glutamate/$\gamma$-dodecyl L-glutamate copolymer prepared in REFERENCE EXAMPLE 1 was put between two 18 cm×7 cm×20 μm films each made of polyethylene terephthalate at its central portion together with an 80 μm-thick spacer, press molded at 128° C. for 10 min with a bench press molding machine and poured into water to allow it to rapidly cool. Subsequently, on the resulting sandwiched film were placed 1.2 g of the $\gamma$-benzyl D-glutamate/$\gamma$-dodecyl D-glutamate copolymer prepared in REFERENCE EXAMPLE 2. A PET film having the same size and thickness as those used above was placed on the copolymer through an 80 μm-thick spacer, and press molding was conducted at 128° C. for 20 min to form a composite film. The composite film was poured into water to allow it to rapidly cool. The film thus obtained was cut into small pieces of 3 cm×7 cm. The small pieces were heated in an air thermostatic oven kept at a predetermined temperature for 2 hr and then poured into water to allow it to rapidly cool.

Spectral properties of the filter thus obtained was determined. The results are shown in Table 1.

TABLE 1

| heating temperature (°C.) | selective reflection wavelength (nm) | degree of reflection (%) | half value width of spectrum (μm) |
|---|---|---|---|
| 128 | 428 | 93 | 20 |
| 134 | 500 | 92 | 22 |
| 140 | 556 | 92 | 23 |
| 148 | 636 | 90 | 25 |
| 154 | 756 | 90 | 30 |

As is apparent from Table 1, the composite film prepared in this example exhibited a sharp reflection at each wavelength and was confirmed to be usable as an excellent notch filter which exhibits a degree of reflection (cut-off degree of light) of 90% or more.

EXAMPLE 2

When the film having a selective reflection wavelength of 756 nm and obtained by heating at 154° C. in EXAMPLE 1 was heated in an air thermostatic oven kept at 128° C. for 2 hr, the selective reflection wavelength of the film shifted to 428 nm, and the film had an excellent performance, i.e. a half value width of 21 nm and a degree of reflection of 92%. As is apparent from the foregoing, it was found that the shift from a certain specific selective reflection wavelength to another selective reflection wavelength could easily be made by heating.

REFERENCE EXAMPLE 3

20 g of poly($\gamma$methyl L-glutamate)(molecular weight: 150000; average degree of polymerization: 1050) was dissolved in 300 ml of a 1,2-dichloroethane/tetrachloroethylene(8/2) mixed solvent. To the resulting solution were added 100 ml of n-hexanol and 5 g of p-toluenesulfonic acid. The reaction was allowed to proceed at 60° C. for 20 hr. The reaction mixture was poured into a large amount of methanol to precipitate the formed polymer. The polymer was collected and dried. Subsequently, the polymer was dissolved in 1,2-dichloroethane again, reprecipitated with methanol, filtered and dried to obtain a purified $\gamma$-methyl L-glutamate/$\gamma$-hexyl L-glutamate copolymer. The ratio of the methyl ester to the hexyl ester in the copolymer was determined by NMR and was found to be 51:49.

EXAMPLE 3

A sandwich film was prepared using 1.2 g of the copolymer obtained in REFERENCE EXAMPLE 3 by putting the copolymer between two PET films and press molding it at 168° C. for 10 min in the same manner as in EXAMPLE 1. Subsequently, the sandwich film was heated at 173° C. for 2 hr in a thermostatic oven and rapidly cooled to obtain a composite film. The composite film reflected 45% of light of 400 nm in wavelength. In this connection, it was confirmed that the reflected light was a right-handed circularly polarized light while the transmitted light was a left-handed circularly polarized light. As is apparent from the foregoing, the film prepared in this example proved to exhibit excellent characteristics as a circularly polarizing filter.

REFERENCE EXAMPLE 4

20 g of poly(γ-butyl L-glutamate)(molecular weight: 21000; average degree of polymerization: 115) prepared by the NCA method was dissolved in 1,2-dichloroethane. To the resulting solution were added 150 ml of n-dodecyl alcohol and 5 g of p-toluenesulfonic acid. The reaction was allowed to proceed at 60° C. for 20 hr. The reaction mixture was treated in the same manner as in REFERENCE EXAMPLE 1 to obtain a γ-butyl L-glutamate/γ-dodecyl L-glutamate copolymer. The ratio of the butyl ester to the dodecyl ester in the copolymer was determined by NMR and was found to be 40:60.

REFERENCE EXAMPLE 5

A γbutyl D-glutamate/γ-dodecyl D-glutamate copolymer was prepared using poly(γ-butyl D-glutamate)(molecular weight: 20000; average degree of polymerization: 108) in the same manner as in REFERENCE EXAMPLE 4. The ratio of the butyl ester to the dodecyl ester in the copolymer was determined and was found to be 40:60.

EXAMPLE 4

1.0 g of the copolymer obtained in REFERENCE EXAMPLE 4 was put between two 18 cm×7 cm×40 μm films each made of polymetylpentene through the medium of a 40 μm-thick spacer, press molded at 110° C. for 20 min with a bench press molding machine and poured into a water to allow it to rapidly cool. Subsequently, on the resulting sandwich film were placed 1.2 g of the copolymer prepared in REFERENCE EXAMPLE 5. Another polymethylpentene film having the same size and thickness as those used above was placed on the copolymer through a 40 μm-thick spacer, and press molding was conducted at 110° C. for 20 min to form a composite film. The composite film was poured into a water to allow it to rapidly cool. The film thus obtained was cut into small pieces of 3 cm×7 cm. The small pieces were heated in an air thermostatic oven kept at a predetermined temperature for 2 hr and then poured into water to allow it to rapidly cool.

Spectral properties of the filter thus obtained was determined. The results are shown in Table 2.

TABLE 2

| heating temperature (°C.) | selective reflection wavelength (nm) | degree of reflection (%) | half value width of spectrum (μm) |
|---|---|---|---|
| 110 | 480 | 92 | 28 |
| 120 | 568 | 91 | 30 |
| 130 | 753 | 91 | 33 |
| 140 | 840 | 90 | 39 |
| 150 | 1020 | 90 | 41 |

As is apparent from Table 2, the composite film prepared in this example proved to be an excellent filter which not only exhibits a sharp reflection spectrum and a satisfactory cut-off degree of light but also exhibits excellent characteristics even in a near infrared region.

The optical filter of the present invention consisting essentially of a glutamate copolymer having thermotropic cholesteric liquid crystal properties serves as a circularly polarizing filter which selectively reflects or transmits only either a right-handed circularly polarized light or left-handed circularly polarized light of a specific wavelength with high efficiency when it is used alone. Further, the optical filter of the present invention can serve as a notch filter which selectively cuts off the light of a specific wavelength by laminating two films, which are reverse in optical rotation with respect to the same wavelength, in such a manner that the optical axes are parallel to each other. Moreover, the optical filter of the present invention can serve as a band-pass filter which transmits the light of a specific wavelength by laminating a plurality of pairs of films having different reflection wavelengths in such a manner that a specific wavelength range can pass and all the other wavelength ranges can be cut off.

Since the optical filter of the present invention consists essentially of a glutamate copolymer having thermotropic cholesteric liquid crystal properties, it is superior to the optical filter prepared from a polyglutamate having lyotropic cholesteric liquid crystal properties in that in producing it there is no need for conducting complicated procedures, that the selective reflection wavelength can freely controlled by simply controlling the heating temperature and that the cholesteric structure can easily be immobilized by a mere physical procedure, i.e., rapid cooling. Further, it is possible to shift the selective reflection wavelength from a certain wavelength to another wavelength by simply heating it at a different temperature and then rapidly cooling. According to the present invention, since a polymer having thermotropic liquid crystal properties is used, the cholesteric liquid crystal structure can completely be oriented by application of a shearing force, which leads to excellent spectral characteristics, i.e., sufficient cut-off degree of light (or transmittance) and sharp spectrum of the resulting filter.

As is apparent from the foregoing, the optical filter of the present invention not only exhibits excellent spectral characteristics and can be used as a multipurpose filter but also is high in industrial value because it is easily produced at low cost, and is advantageously used as a notch filter for a color display, a branching filter in optical communications, a light isolator, a half mirror, etc.

What is claimed is:

1. A process of preparing an optical filter comprising a compolyglutamate having thermotropic cholesteric liquid crystal properties which comprises:
   (a) heating a copolymer at a temperature higher than its transition temperature to cholesteric structure, said copolymer being a glutamate copolymer having thermotropic cholesteric liquid crystal properties and represented by the general formula:

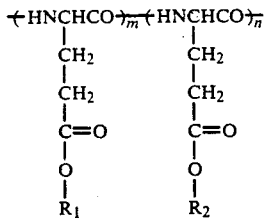

wherein, $R_1$ is an alkyl group, a cycloalkyl group, an aryl group or an arylalkyl group having 10 or less carbon atoms, and $R_2$ an alkyl group, a cycloalkyl group, an aryl group or an arylalkyl group having 6 to 30 carbon atoms, provided that $R_1$ and $R_2$ are different from each other;

$R_2$ has at least 5 more carbon atoms than $R_1$;

the $R_1$ glutamate units and the $R_2$ glutamate units of the copolymer are both either in the L-form or the D-form; and m and n are numbers satisfying the following relationships $50 \leq m+n \leq 2000$ and $m/n = (80$ to $10)/(20$ to $90)$;

(b) applying a mechanical shearing force to said copolymer;

(c) heating said copolymer, while said shearing force is being applied or after said shearing force is removed, for a period of time and at a temperature effective to provide the formation of a cholesteric pitch in said copolymer which exhibits a specific reflective wavelength and;

(d) rapidly cooling said copolymer to immobilize the cholesteric pitch.

2. A process according to claim 1, wherein m/n is (70 to 40)/(30 to 60).

3. An optical filter prepared by the process according to claim 1 wherein the optical filter comprises a laminated film structure comprising a glutamate copolymer film capable of reflecting a right-handed circularly polarized light of a specific wavelength and a glutamate copolymer film capable of reflecting a left-handed circularly polarized light of the same wavelength as said right-handed circularly polarized light laminated thereon in such a manner that the optical axes of said two glutamate copolymer films are parallel to each other.

4. An optical filter prepared by the process according to claim 1 wherein the optical filter comprises a laminated film structure comprising two or more pairs of films which are different from each other in reflection wavelength and which are laminated on top of each other so that the optical axes are parallel to each other.

5. A process for modifying the specific reflective wavelength of an optical filter which has previously been prepared according to the process of claim 1 which comprises:

(a) heating said copolymer for a period of time at a temperature higher than its transition temperature to cholesteric structure, said time and temperature being effective to provide the formation of a cholesteric pitch in said copolymer which exhibits a predetermined specific reflective wavelength other than the specific reflective wavelength exhibited by said copolymer prior to step (a) herein, and (b) rapidly cooling said copolymer to immobilize the cholesteric pitch which exhibits the predetermined specific reflective wavelength.

* * * * *

UNITED STATES PATENT AND TRADEMARK OFFICE
CERTIFICATE OF CORRECTION

PATENT NO. : 5,037,186

DATED : August 6, 1991

INVENTOR(S) : Hiroyuki Itoh, et al.

It is certified that error appears in the above-identified patent and that said Letters Patent is hereby corrected as shown below:

Column 3, line 51: "n = 2000" should read as $--n \leq 2000--$

Signed and Sealed this

Twenty-fourth Day of November, 1992

*Attest:*

DOUGLAS B. COMER

*Attesting Officer*      *Acting Commissioner of Patents and Trademarks*